2,480,043

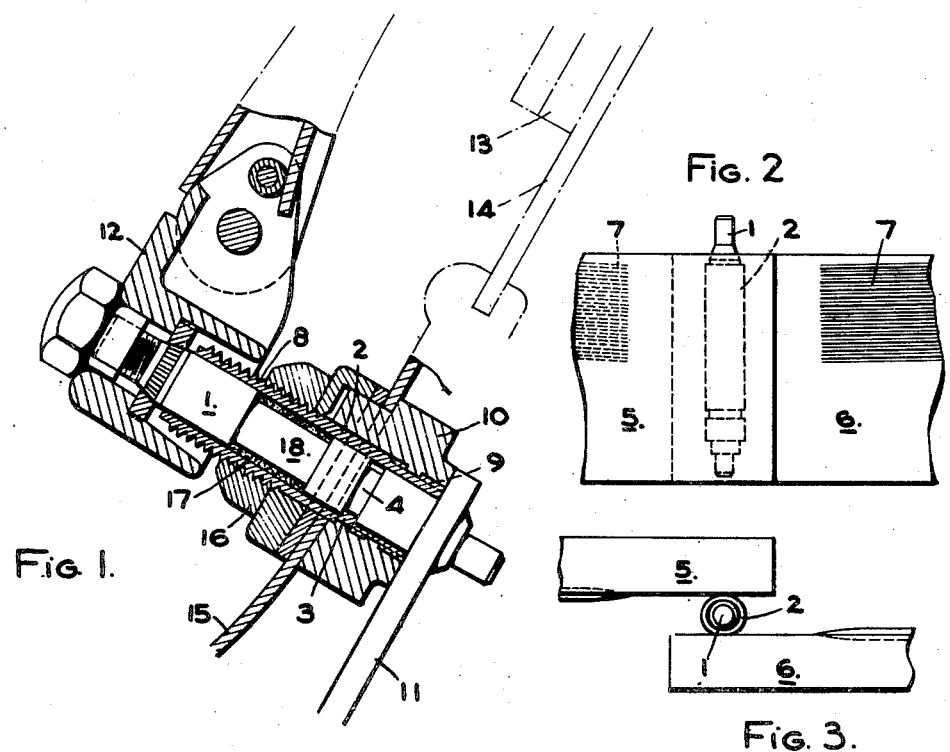
Fig. 1.
Fig. 2.
Fig. 3.
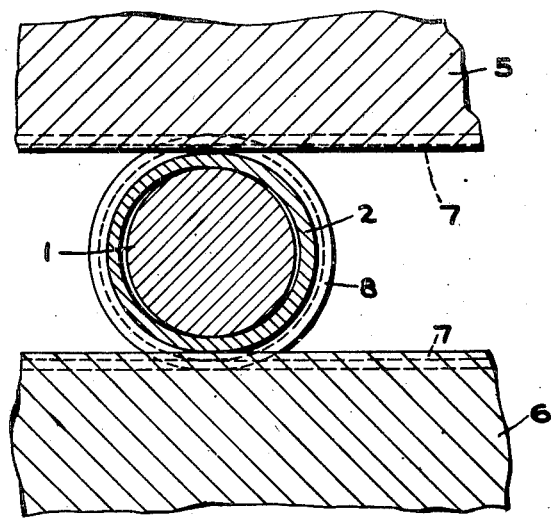
Fig. 4.
INVENTOR
WILLIAM PAULUS AND EARL V. SCHAAL
BY
ATTORNEYS Patented Aug. 23, 1949

UNITED STATES PATENT OFFICE 2,480,043

METHOD OF JOURNALING A SHAFT IN A BUSHING

William Paulus, Buffalo, and Earl V. Schaal, East Aurora, N. Y., assignors to Trico Products Corporation, Buffalo, N. Y.

Application May 5, 1945, Serial No. 592,170

3 Claims. (Cl. 29—149.5)

This invention relates to a shaft mounting and the method of making the same. Heretofore the practice of journaling the shaft in a bushing sleeve has necessitated a refined and tedious procedure in order to fit the parts against objectionable looseness or play.

It is the object of the present invention to provide a shaft-bushing unit which is substantially free of looseness and one which is more efficient.

Further, the invention has for its object to provide a method of producing such unit which is simple and practical.

In the drawing:

Fig. 1 is a view showing a practical application of the shaft unit;

Fig. 2 is a fragmentary plan view showing the unit interposed between the pressure or die members employed in carrying out the shaft freeing step;

Fig. 3 is a fragmentary side elevation thereof; and

Fig. 4 is an enlarged fragmentary sectional view through the rolling members at the point of thread formation.

Referring more particularly to the drawing, the numeral 1 designates a shaft and 2 its mounting bushing, from which latter is pressed one or more lugs 3 for interlocking with a groove 4 in the shaft to secure said shaft from being axially displaced. The diameter of the shaft is such as to tightly fit within the bushing initially, and this tight fit may be provided by making the shaft of a diameter which will necessitate the shaft being forced or driven into the bushing in an axial direction. As an alternative the bushing could be slightly larger than the shaft to easily fit thereover and then the bushing contracted, by the application of mechanical pressure, to tightly fit on the shaft.

This unites the shaft and its bushing into a unit interlocked by the key lugs 3, with the bushing tightly embracing the shaft against relative rotary movement. To disrupt this tight embrace and thereby enable the shaft to turn freely in its bushing with a minimum clearance between the parts, the unit is rolled by and between a pair of opposing pressure or die members 5 and 6 which subject the unit to a radial pressure while the same is being rolled. This radial applied pressure on the bushing at diametrically opposed points tends to enlarge the internal diameter of the bushing by causing the bushing material to flow laterally or circumferentially about the shaft at opposite sides of the line of pressure application, as is shown on an exaggerated scale in Fig. 4. Consequently, as this pressure is continuously applied during the rolling of the unit by and between the oppositely moving dies, the bushing will become stretched or enlarged in diameter sufficiently to free the shaft for turning therein with a minimum clearance between the parts. The shaft is therefore given a substantial journal support in its mounting sleeve or bushing wherein all looseness or play have been eliminated to a practical extent.

Where the bushing is to be externally threaded, the end portions of the dies may be shaped with a thread cutting formation 7 for rolling the threads 8 on the bushing. This thread cutting step may be performed concurrently with the bushing stretching operation although it is preferable to carry out the thread cutting subsequent thereto. Likewise, an anchoring knurl 9 may be rolled on the sleeve or bushing at the time of the clearance roll, or subsequent thereto. For mounting the bushing a body 10 may be die cast about the knurl and over the interlocking lugs 3, thereby giving support to the latter as well as providing a firm mounting for the bushing.

From the foregoing it will be observed that a practical method has been provided which simplifies the manufacture of the unit in that the shaft does not have to be preliminarily finished to a slightly smaller diameter in order to rotate freely within the bushing when placed therein, disregarding imperfections or irregularities which may also occur in the bushing itself. The shaft freeing step may obviously be performed between opposing pressure members having flat active surfaces throughout, and then if the external threads 8 are required these may be rolled in or otherwise suitably formed by a separate procedure.

The shaft unit may have a wide variety of applications. In Fig. 1 the unit has been depicted in association with the windshield cleaner mechanism of a motor vehicle. In this illustration the power arm 11 is fixed on the inner end of the shaft while a wiper carrying arm 12 is fixed on the outer end of the shaft for oscillating its carried wiper 13 over the windshield surface 14. The die cast body 10 is arranged in an opening in the cowl 15 where it is clamped by the nut 16. An oil holding felt 17 may be assembled with the shaft by disposing the same about a reduced portion 18 thereof.

This provides a wiper shaft mounting practically devoid of all looseness. It is economical in production by reason of its simplicity and is therefore practical.

While the foregoing description has been given in detail, the invention may be practiced and carried out otherwise without departing from the spirit of the invention and its scope defined by the appended claims.

What is claimed is:

1. The method of journaling a shaft in a bushing to obtain relative rotation between the two parts with a minimum clearance, consisting in tightly fitting the shaft in the bushing of bearing material against turning therein, and then rolling the fitted unit under pressure between relatively movable members to cause the bushing material to flow circumferentially and thereby enlarge the internal diameter of the bushing sufficient to free the shaft for turning therein.

2. The method of journaling a shaft in a bushing to obtain relative rotation between the two parts with a minimum clearance, consisting in fitting the shaft in the bushing against turning therein, then rolling the fitted unit under pressure between relatively movable members to enlarge the internal diameter of the bushing sufficient to free the shaft for turning therein, and threading the bushing externally concurrently with the rolling.

3. The method of journaling a shaft in a bushing to obtain relative rotation between the two parts with a minimum clearance, consisting in tightly fitting the shaft in the bushing of bearing material against turning therein, interlocking the shaft to the bushing into a unit against axial displacement the one from the other, and then rolling the fitted unit under pressure between relatively movable members to cause the bushing material to flow circumferentially and thereby enlarge the internal diameter of the bushing sufficient to free the shaft for turning therein while retaining the interlock against relative axial displacement.

WILLIAM PAULUS.
EARL V. SCHAAL.

REFERENCES CITED

The following references are of record in the file of this patent:

UNITED STATES PATENTS

| Number | Name | Date |
|---|---|---|
| 1,100,695 | Offut | June 16, 1914 |
| 1,605,561 | Rabbezzana | Nov. 2, 1926 |
| 1,798,738 | Hoern | Mar. 31, 1931 |
| 1,900,345 | Richardo | Dec. 19, 1933 |
| 1,939,444 | Geyer | Dec. 12, 1933 |
| 1,940,345 | Brownlee | Dec. 19, 1933 |
| 1,945,294 | Pike et al. | Jan. 30, 1934 |
| 2,026,774 | Davis | Jan. 7, 1936 |
| 2,180,883 | Scott | Nov. 21, 1939 |
| 2,197,883 | Sinclair | Apr. 23, 1940 |
| 2,252,351 | Paulus | Aug. 12, 1941 |
| 2,335,710 | Townsend | Nov. 30, 1943 |